(12) United States Patent
Kataoka et al.

(10) Patent No.: US 7,721,862 B2
(45) Date of Patent: May 25, 2010

(54) POWER TRANSMITTING APPARATUS

(75) Inventors: Makoto Kataoka, Shizuoka (JP); Shunichi Itou, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 12/163,827

(22) Filed: Jun. 27, 2008

(65) Prior Publication Data
US 2008/0308382 A1 Dec. 18, 2008

Related U.S. Application Data

(63) Continuation of application No. PCT/JP2006/324518, filed on Dec. 8, 2006.

(30) Foreign Application Priority Data
Dec. 28, 2005 (JP) .............................. 2005-376982

(51) Int. Cl.
*F16D 43/21* (2006.01)
*F16D 13/04* (2006.01)
*F16D 13/70* (2006.01)

(52) U.S. Cl. .................. 192/54.5; 192/56.6; 192/70.23; 192/93 A

(58) Field of Classification Search ................ 192/54.5, 192/56.6, 70.23
See application file for complete search history.

(56) References Cited

U.S. PATENT DOCUMENTS

| 2,049,127 | A | * | 7/1936 | Maybach | .................. | 192/69.8 |
| 2,950,797 | A | * | 8/1960 | Zieher | ........................ | 192/108 |
| 3,543,896 | A | * | 12/1970 | Mooney | ...................... | 192/46 |
| 2005/0150736 | A1 | * | 7/2005 | Kataoka et al. | ............ | 192/54.5 |
| 2006/0096829 | A1 | * | 5/2006 | Kataoka et al. | ............ | 192/54.5 |

FOREIGN PATENT DOCUMENTS

| JP | 02-150517 A | 6/1990 |
| JP | 10-267049 A | 10/1998 |
| JP | 2005-325993 A | 11/2005 |

* cited by examiner

*Primary Examiner*—Richard M. Lorence
(74) *Attorney, Agent, or Firm*—Knobbe, Martens, Olson & Bear LLP

(57) ABSTRACT

A power transmitting apparatus can comprise a clutch housing, a plurality of driving clutch plates, a plurality of driven clutch plates movable for carrying out the pressure-contact or release relative to the driving clutch plates, a clutch member, a pressure member, pressure-contact assisting cam, back-torque limiting cam characterized in that one set of cam surfaces of the pressure-contact assisting cam or the back-torque limiting cam are arranged so that they extend along a circumferential edge of the clutch member. A crowning can be formed on one set of cam surfaces in their extending direction and/or their width direction.

19 Claims, 7 Drawing Sheets

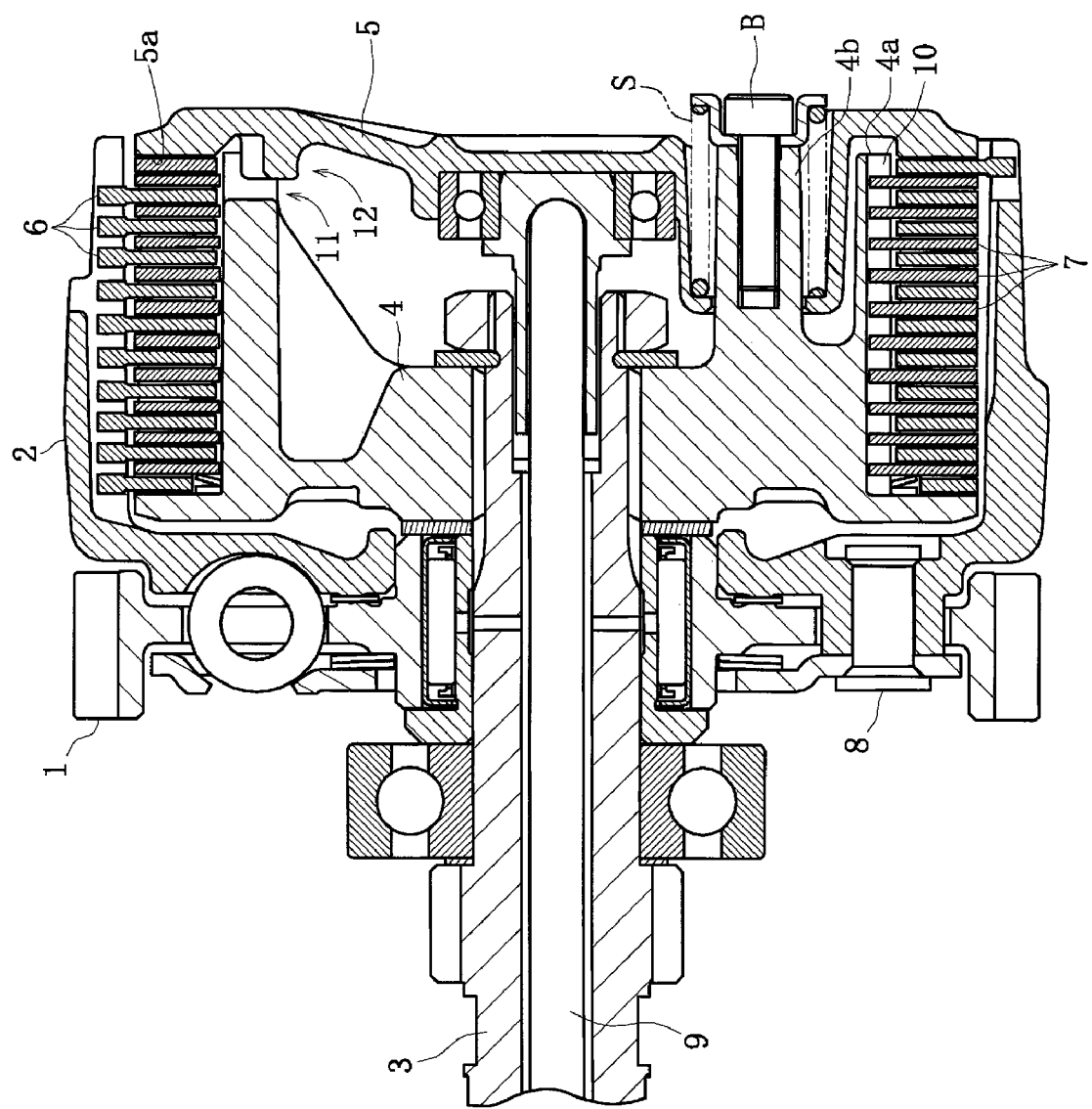
[Fig 1]

[Fig 2]
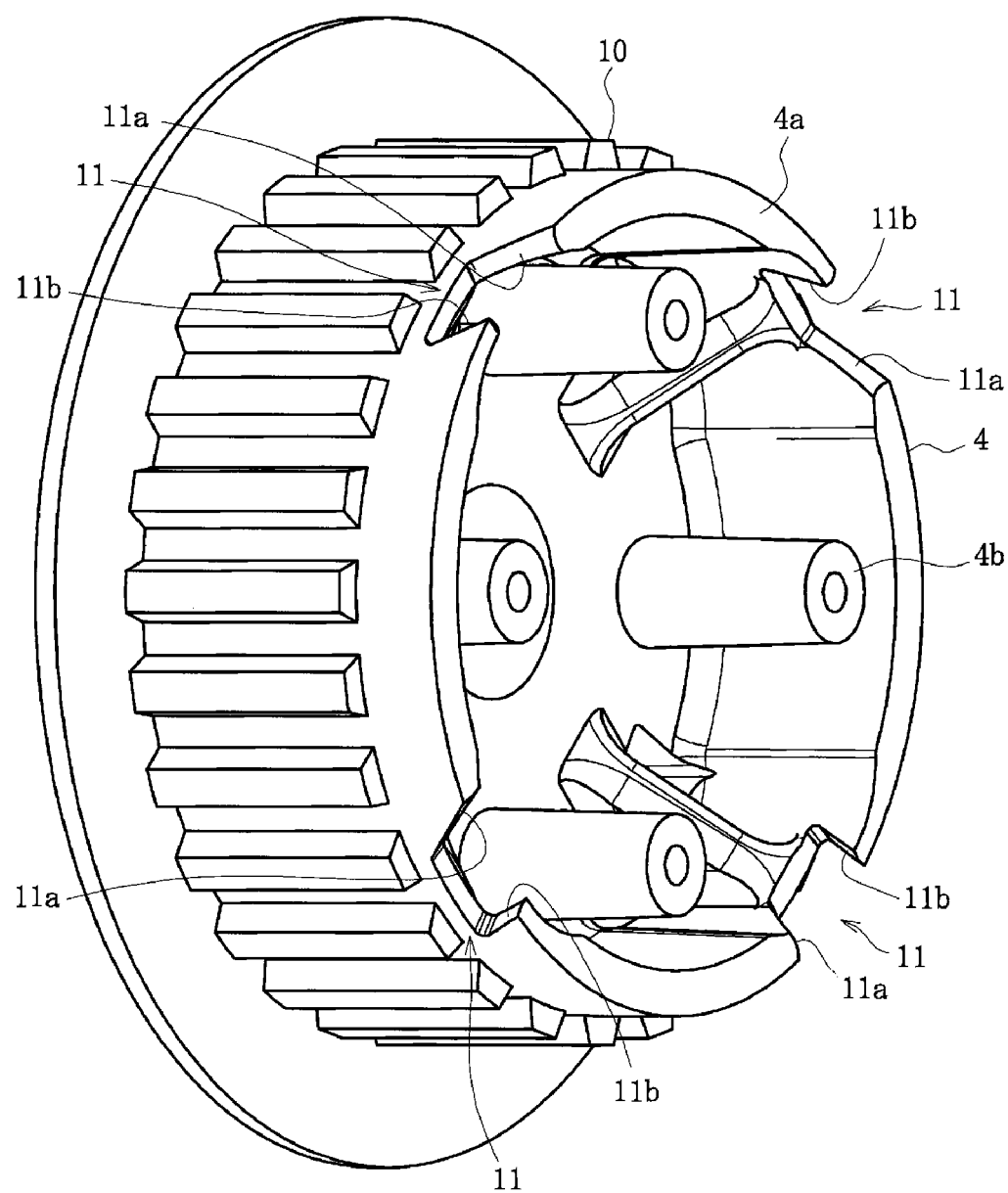

[Fig 3]
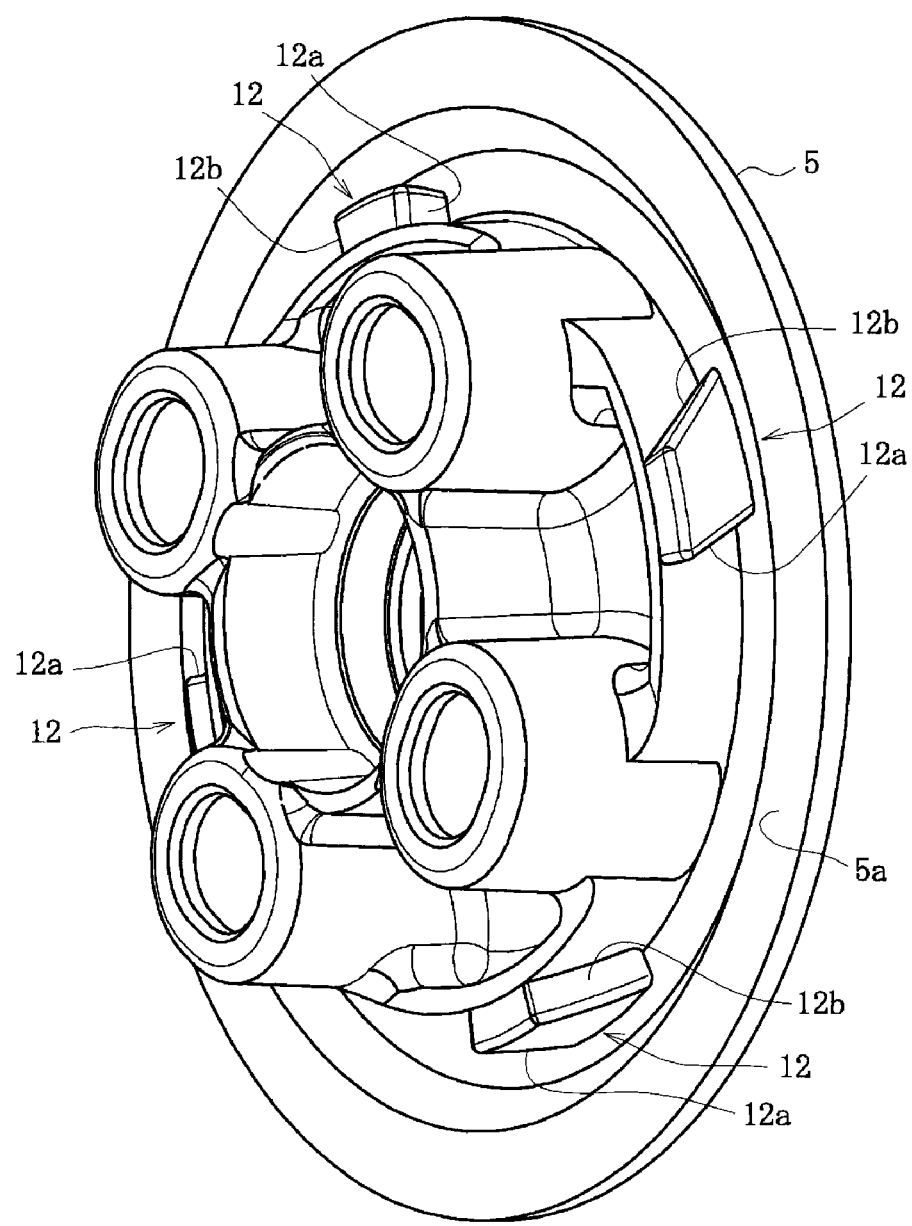

[Fig 4]
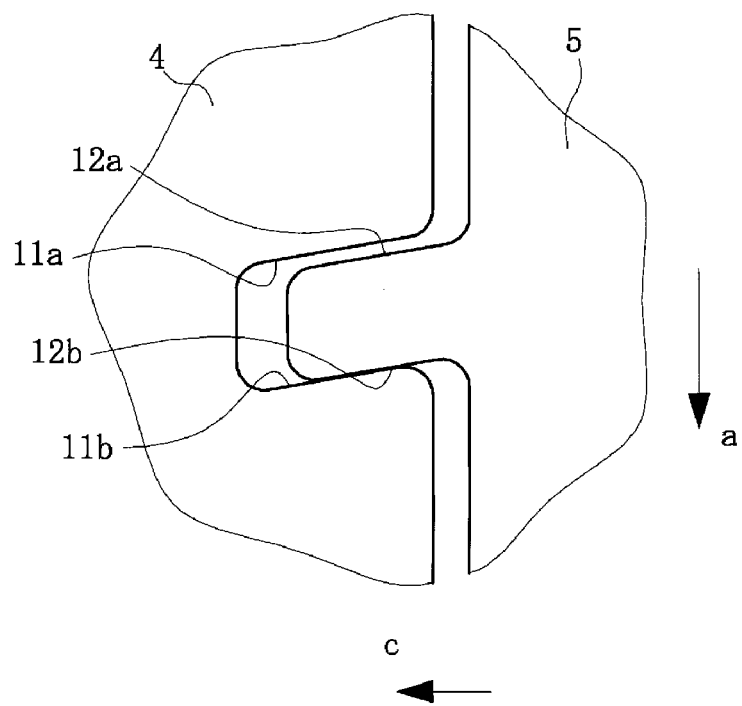
[Fig 5]
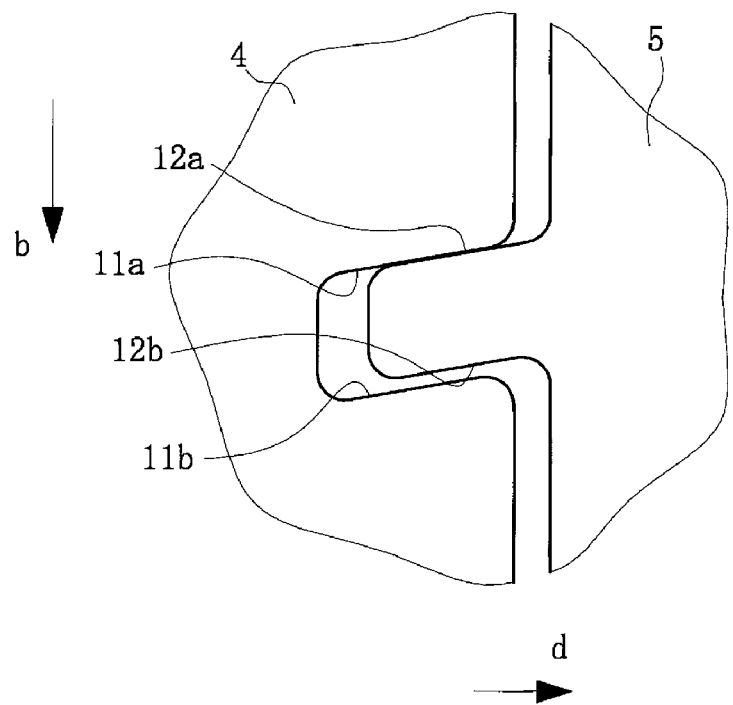

[Fig 6]
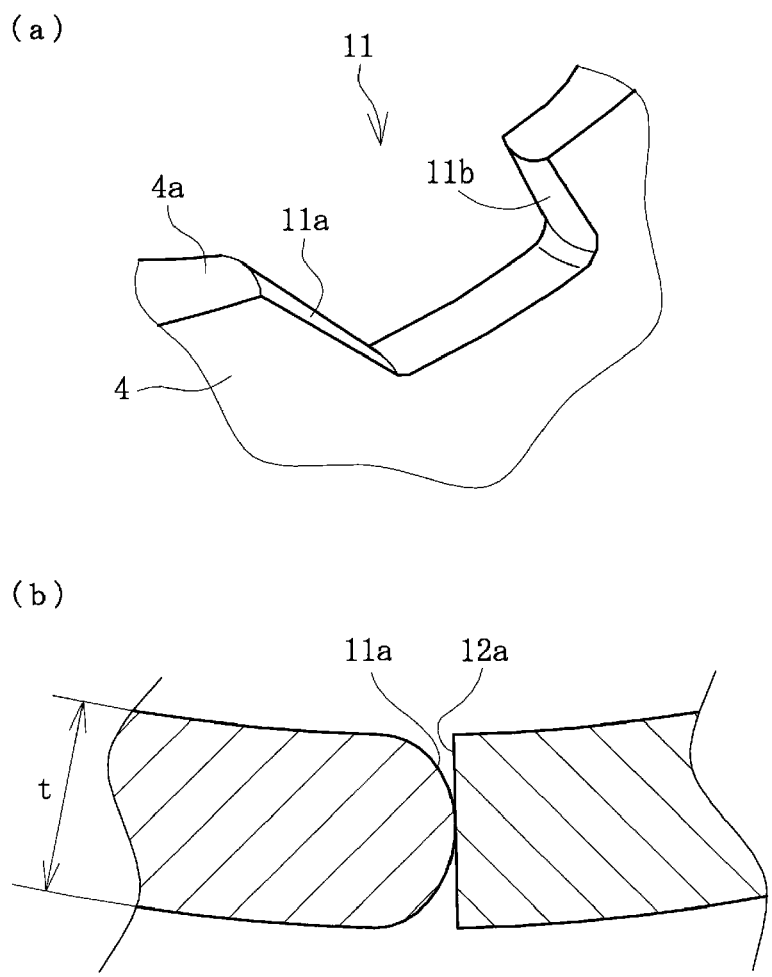
[Fig 7]
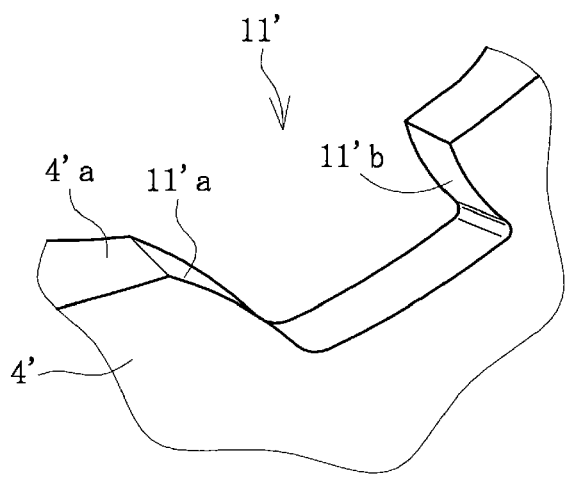

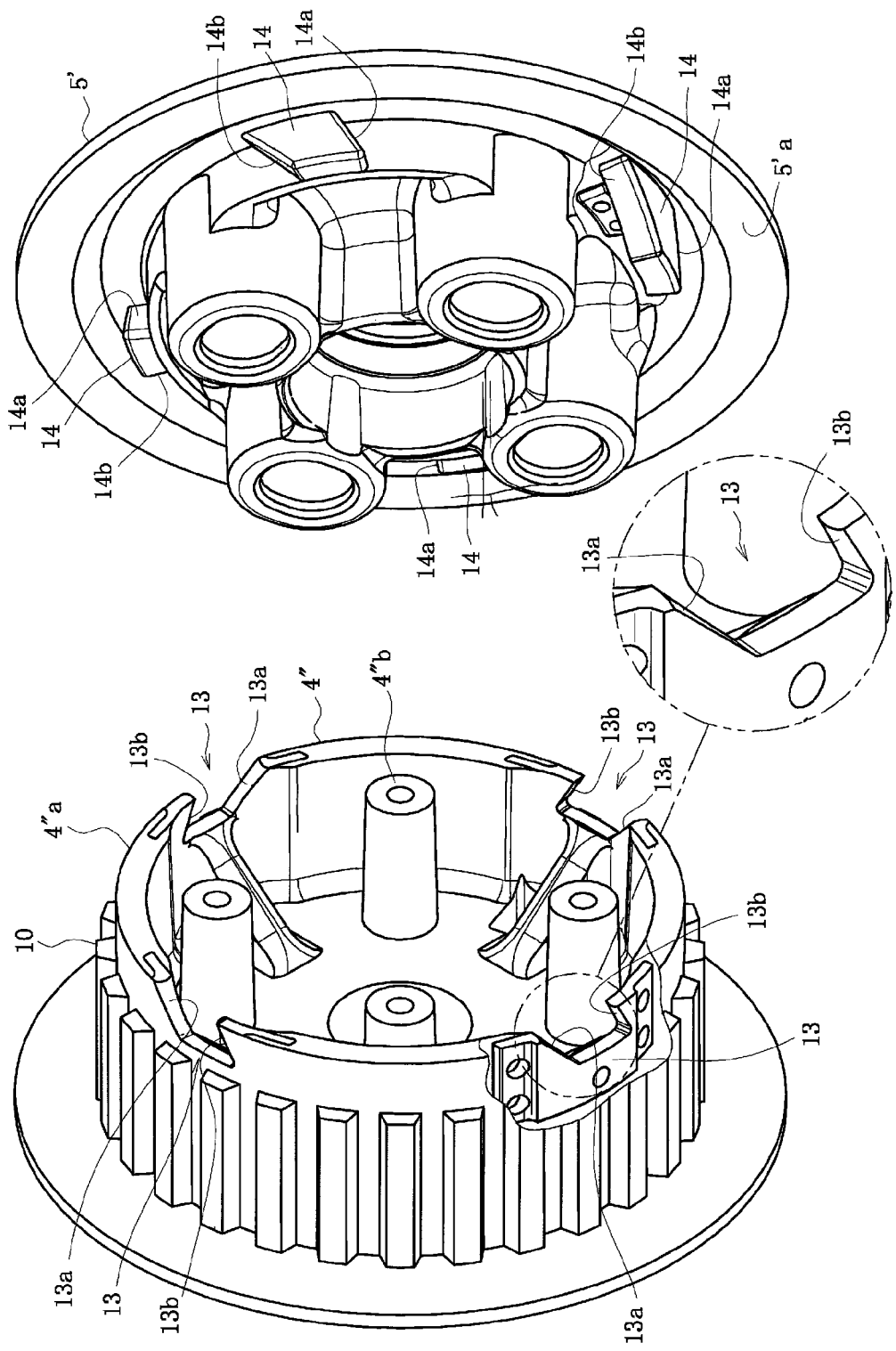
[Fig 8]

[Fig 9a]
(Prior Art)
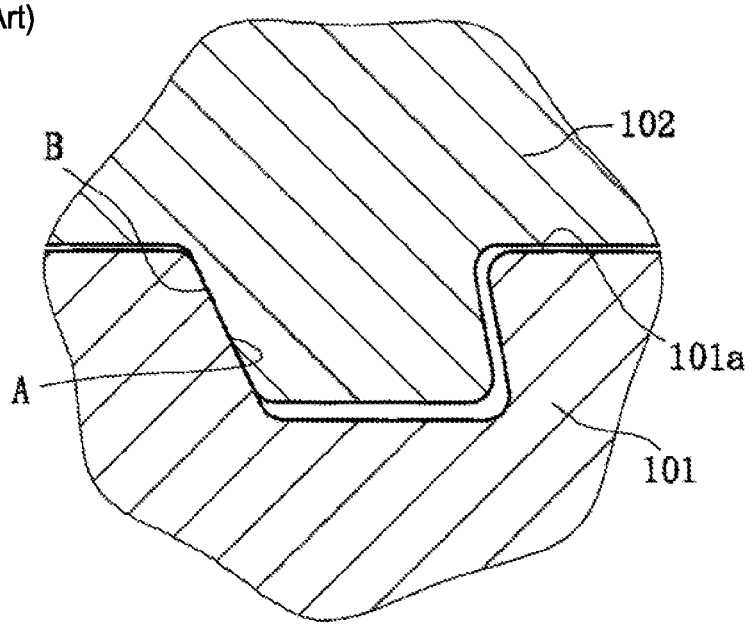
[Fig 9b]
(Prior Art)
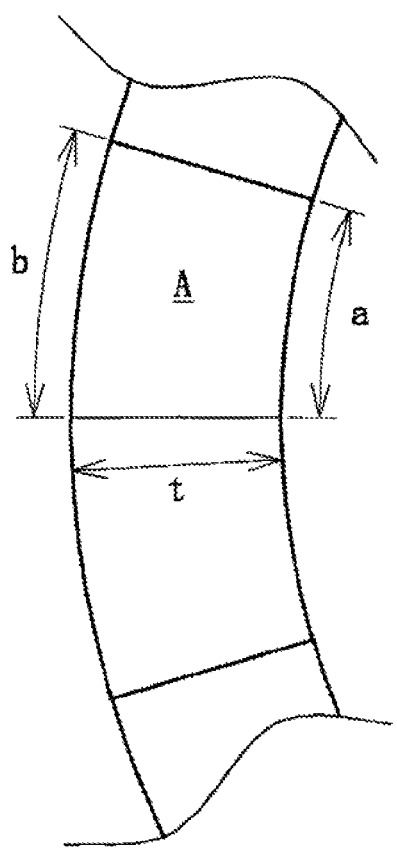

POWER TRANSMITTING APPARATUS

RELATED APPLICATIONS

This application is a Continuation of PCT Application No. PCT/JP2006/324518, filed Dec. 8, 2006, which claims priority to Japanese Application No. 2005-376982, filed Dec. 28, 2005, the entire contents of all of which are hereby incorporated by reference.

BACKGROUND OF THE INVENTIONS

1. Field of the Inventions

The present inventions relate to power transmitting apparatuses for arbitrarily transmitting or cutting-off a rotational force of the input member to or from the output member.

2. Description of the Related Art

In general, power transmission apparatuses for motorcycles are intended to arbitrarily transmit or cut-off a power of an engine to a transmission and a driving wheel. Such power transmission apparatuses typically comprise an input member connected to an engine side, an output member connected to the transmission and the driving wheel side, and a clutch member connected to the output member. The power can be transmitted by pressing together a plurality of driving clutch plates and driven clutch plates and cut-off by releasing the pressure force between the plates.

For example as disclosed in Japanese Laid-open Patent Publication No. 150517/1990, cams are provided for increasing the pressure-contacting force between the driving and driven clutch plates during an ordinary power transmitting phase and the other function, i.e. back-torque limiting function for releasing the driving and driven clutch plates when the rotational speed of an output member has exceeded the rotational speed of an input member. In such a power transmitting apparatus, the cams are formed by gradient surfaces (cam surfaces) formed on the pressure plate and the clutch member.

According to the power transmitting apparatus of this prior art, one set of cam surfaces (pressure-contact assisting cam surfaces) act in an ordinary power transmitting mode to move a pressure plate toward a direction in which both the driving and driven clutch plates are strongly pressed to each other, and on the contrary, in a back-torque absorbing mode the other set of cam surfaces (back-torque limiting cam surfaces) act to move the pressure plate toward a direction in which the pressure-contact between the driving and driven clutch plates are released.

SUMMARY OF THE INVENTIONS

An aspect of at least one of the embodiments disclosed herein includes the realization that, in the power transmitting apparatus of the prior art, the following problems can be caused when one set of cam surfaces of the back-torque limiter are formed on a circumferential edge of the clutch member and the other set of cam surfaces opposed to said one set of cam surfaces are formed on the pressure plate.

For example, as shown in FIG. 9, when one cam surface "A" is formed on a clutch member 101 by cutting out the circumferential edge 10la of the clutch member 101, the larger the width "t" is, the larger a difference between a dimension "a" of radially inside and a dimension "b" of radially outside is. Accordingly a difference in an inclination angle of the cam surface "A" is caused between at its radially inner side and at its radially outer side. That is, when the other cam surface "B" formed on a pressure plate 102 slides on the one cam surface "A", different occasions i.e. one occasion in which the other cam surface "B" slides on the one cam surface "A" at its radially inner side and the other occasion in which the other cam surface "B" slides on the one cam surface "A" at its radially outer side would be caused due to the tolerance therebetween. Accordingly cam characteristics of small inclination angle (angle relative to a direction normal to a sheet of FIG. 9($b$)) of cam surface would be caused when the other cam surface "B" slides on the one cam surface "A" at its radially inner side, on the contrary cam characteristics of large inclination angle of cam surface would be caused when the other cam surface "B" slides on the one cam surface "A" at its radially outer side. Thus it is a problem that it is difficult to have an intended cam characteristics when the width "t" of the cam surface is set large in order to reduce the bearing pressure of the cam surface applied thereto.

It is, therefore, an object of at least one of the embodiments disclosed herein to provide a power transmitting apparatus which can surely obtain the intended cam characteristics even though the width of the cam surface is set large when either one cam surface of the pressure-contact assisting cam or the back-torque limiting cam is formed along the circumferential edge of the clutch member.

Thus, in accordance with an embodiment, a power transmitting apparatus can comprise a clutch housing rotatable together with an input member, a plurality of driving clutch plates mounted on the clutch housing and rotatable together with the clutch housing, and a plurality of driven clutch plates alternately arranged between the driving clutch plates and movable between pressure-contact and release positions relative to the driving clutch plates. A clutch member of a substantially cylindrical configuration can be connected to an output member, the driven clutch plates being mounted on the clutch member. A pressure member can be configured to be moveable so as to press and release the driving clutch plates relative to the driven clutch plates. A pressure-contact assisting cam can be configured to increase a pressure-contacting force between the driving clutch plates and driven clutch plates when a condition in which a rotational force input to the input member is transmitted to the output member. A back-torque limiting cam can be configured to release the connection between the driving clutch plates and the driven clutch plates when the rotation speed of the output member has exceeded that of the input member. At least one set of cam surfaces of at least one of the pressure-contact assisting cam and the back-torque limiting cam can be arranged so that they extend along a circumferential edge of the clutch member. Additionally, said one set of cam surfaces can be crowned in at least one of an extending direction and a width direction.

In accordance with another embodiment, a power transmitting apparatus can comprise a pressure-contact assisting cam configured to increase a pressure-contacting force between driving clutch plates and driven clutch plates. A back-torque limiting cam can be configured to release the connection between the driving clutch plates and the driven clutch plates. At least one set of cam surfaces of at least one of the pressure-contact assisting cam and the back-torque limiting cam can be arranged so that they extend along a circumferential edge of the clutch member. Additionally, said one set of cam surfaces can be crowned in at least one of an extending direction and a width direction.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a longitudinal section view of a power transmitting apparatus of a first embodiment;

FIG. 2 is a perspective view showing a clutch member of the power transmitting apparatus of FIG. 1;

FIG. 3 is a perspective view showing a pressure member of the power transmitting apparatus of FIG. 1;

FIG. 4 is a schematic view showing the action of the pressure-contact assisting cam during a normal rotation of the clutch member;

FIG. 5 is a schematic view showing the action of the back-torque limiting cam during a reverse rotation (under a condition in which a back-torque is applied to the power transmitting apparatus) of the clutch member;

FIG. 6 (a) is an enlarged perspective view of the one set of cam surfaces formed on the clutch member of the power transmitting apparatus, and FIG. 6(b) is an explanatory schematic view showing a contacting condition between one set of cam surfaces and the other set of cam surfaces;

FIG. 7 is an enlarged perspective view of a modification of the one set of cam surfaces formed on the clutch member;

FIG. 8 is a partially sectioned perspective view showing a clutch member and a pressure member in the power transmitting apparatus according to a second embodiment; and FIG. 9 (a) is an explanatory schematic view showing a problem of cam surfaces of the power transmitting apparatus of the prior art, and FIG. 9(b) is a similar explanatory schematic view showing a problem of cam surfaces of the power transmitting apparatus of the prior art.

DETAILED DESCRIPTION OF THE PREFERRED EMBODIMENT

A power transmitting apparatus of a first embodiment can be mounted on a vehicle such as a motorcycle to arbitrarily ("selectively") transmit or cut-off the driving force of an engine to or from a transmission or driving wheel. The power transmitting apparatus is disclosed in the context of a motorcycle because it has particular utility in this context. However, the power transmitting apparatus can be used in other contexts, such as, for example, but without limitation, other vehicles including land vehicles.

As shown in FIG. 1, the power transmitting apparatus can comprise a clutch housing 2 on which a gear 1 as an input member is mounted, a clutch member 4 connected to a shaft 3 as an output member, a pressure plate 5 mounted on the clutch member 4 at its right end (in view of FIG. 1) thereof, driving clutch plates 6 connected to the clutch housing 2, and driven clutch plates 7 connected to the clutch member 4, and an engaging member 12 (a first engaging member 12a and a second engaging member 12b).

The gear 1 can be rotated around the shaft 3 by a driving force (rotational force) transmitted from the engine and connected to the clutch housing 2 via rivets 8 etc. The clutch housing 2 can be a cylindrical casing member opened at the right end thereof and provided with a plurality of driving clutch plates 6 on the inner circumferential wall thereof. Each of the driving clutch plates 6 can be formed as a substantially annular plate member and adapted to be rotated together with the clutch housing 2 and to be axially slid thereon.

The clutch member 4 can be formed as a cylindrical casing member opened at the right end thereof and adapted to be received within the clutch housing 2. The shaft 3 can pass through the center of the clutch member 4 and can be connected thereto via a spline connection and thus can be rotated by the clutch member 4. Axially extending spline 10 can be formed on the outer circumferential surface of the clutch member 4 and the driven clutch plates 7 are fitted on the spline 10.

In some embodiments, the spline 10 can be formed by alternately arranged projections and grooves around the outer circumferential surface of the clutch member 4, as shown in FIG. 2. A central bore of each driven clutch plate 7 formed with projections and grooves corresponding to those of the clutch member 4 can be fitted on the clutch member so that the driven clutch plate 7 can axially slide on the clutch member 4 but cannot rotate relative to the clutch member 4.

These driven clutch plates 7 can be arranged alternately with the driving clutch plates 6 so that mutually adjacent clutch plates 6 and 7 can be pressure-contacted or released. That is, both clutch plates 6 and 7 are allowed to axially slide respectively on the clutch housing 2 and the clutch member 4 and thus pressure-contact each other when pushed by the pressure plate 5 toward a left direction (in view of FIG. 1) so that the rotational force can be transmitted from the clutch housing 2 to the clutch member 4 and the shaft 3. On the other hand, when releasing the pressure of the pressure plate 5, they are also released from each other and the clutch member 4 does not follow the rotation of the clutch housing 2 and can be stopped so that no power is transmitted to the shaft 3.

In this case, it should be noted that "release" of the clutch plates 6 and 7 means a condition in which the pressure-contact is lost and thus the clutch member 4 does not follow the rotation of the clutch housing 2 (i.e. a condition in which the driving clutch plates 6 slide on the driven clutch plates 7) and thus there may or may not be clearance between the clutch plates 6 and 7.

The pressure plate 5 can have a substantially disc-shaped configuration such as closing the opening (the right end) of the clutch member 4 and is normally urged toward a left direction by the clutch spring S. That is, the urging of the pressure plate 5 can be performed by the clutch spring S arranged between a boss portion 4b projected from the clutch member 4 and extending through the pressure plate 5 and a head of a clutch bolt B screwed in the boss portion 4b.

The circumferential edge portion 5a of the pressure plate 5 abuts the clutch plate 7 positioned at right-most position and the clutch plates 6 and 7 are normally pressure-contacted each other by the clutch spring S. Accordingly, the clutch housing 2 and the clutch member 4 are kept in a normally connected condition so that the gear 1 can rotate the shaft 3 when the rotational force is inputted to the gear 1.

The pressure-contact force between the driving and driven clutch plates 6 and 7 can be released when a driver of vehicle operates a push rod 9 to move it toward a right direction (in view of FIG. 1) so as to move the pressure plate 5 toward a right direction against the urging force of the clutch spring S. When the pressure-contacting force between the driving and driven clutch plates 6 and 7 is released, the rotational force inputted to the gear 1 and the clutch housing 2 is cut-off and thus cannot be transmitted to the shaft 3. That is, the pressure-contact or the release between the plates 6 and 7 can be performed by the axial movement of the push rod 9 and accordingly the pressure plate 5.

In addition, the clutch member 4, in some embodiments, can be formed as shown in FIG. 2 with one set of cam surfaces 11 (11a, 11b) by cutting out a portion of the circumferential edge 4a (end face of an opening). The pressure member 5, in some embodiments, can be formed as shown in FIG. 3 with the other set of cam surfaces 12 (12a, 12b) as projections projected from the pressure member 5. That is, when the pressure member 5 is assembled to the opened end of the clutch member 4, the one cam surface 11a and the other cam surface 12a cooperate with each other and form the back-torque limiting cam, and the one cam surface 11b and the other cam surface 12b cooperate each other and form the pressure-contact assisting cam.

When a condition in which a rotational force inputted to the gear 1 and the clutch housing 2 can be transmitted to the shaft 3 via the clutch member 4 is achieved, the pressure member 5 begins to rotate toward an arrow "a" as shown in FIG. 4. Accordingly the pressure member 5 is caused to move to a direction shown by an arrow "c" in FIG. 4 by the action of the pressure-contact assisting cam formed by the one cam surface 11b and the other cam surface 12b and thus increases the pressing force between the driving clutch plates 6 and driven clutch plates 7.

On the other hand, when the rotation speed of the shaft 3 has exceeded the rotation speed of the clutch housing 2 and accordingly the back-torque toward a direction of an arrow "b" of FIG. 5. Accordingly the pressure member 5 can be caused to move to a direction of an arrow "d" by the action of the back-torque limiting cam formed by the one cam surface 11a and the other cam surface 12a and thus can release some of the pressing force between the driving clutch plates 6 and driven clutch plates 7. Thus some troubles which would be caused in the power transmitting apparatus and the power source (engine side) by the back-torque can be avoided.

In some embodiments, the one cam surfaces 11 (i.e. "one set of cam surfaces 11a, 11b") for the pressure-contact assisting cam and the back-torque limiting cam can be formed so that they extend along the circumferential edge of the clutch member 4. In addition, the cam surfaces 11 are crowned in a direction of their widths (i.e. a radial direction of the clutch member 4) as shown in FIG. 6. Each of these crowning has a cross sectional configuration so that the cam surface 11a (also same in the cam surface 11b) can be progressively bulged from its both ends of width "t" toward its width center.

Due to provision of the crowning, the other cam surface 12a, as shown in FIG. 6(b), tends to contact and slide on the one cam surface 11a at substantially width center of the crowning at an initial stage in use. Accordingly it is possible to prevent the one cam surface 11a from being contacted and slid by the other cam surface 12a at positions biased toward radially inner and outer sides from the center. After progress in use, since the crowning is gradually abraded, substantially flat cam surface 11a is formed substantially at the center of the width "t" of the cam surface 11a. This is true in the other cam surface 11b.

Accordingly since it is possible to prevent the one set of cam surfaces 11a, 11b for the pressure-contact assisting cam or the back-torque limiting cam formed along the circumferential edge of the clutch member 4 from being contacted and slid by the other set of cam surfaces 12a, 12b at positions biased extremely radially inward or outward, it is possible to have the intended cam characteristics although the width "t" is set large. In addition since the one set of cam surfaces 11a, 11b are formed by cutting out the circumferential edge of the clutch member 4 and the other set of cam surfaces 12a, 12b are projections integrally with the pressure member 5, it is possible to form the one set of cam surfaces and the other set of cam surfaces at the time of casting the clutch member 4 and the pressure member 5 and also to form the crowning during the forming of the one set of cam surfaces 11a, 11b.

Although it is illustrated that each of the one set of cam surfaces 11a, 11b has a crowning bulged at its center in the width direction, it is also possible to form one set of cam surfaces 11' (11'a, 11'b) extending along a circumferential edge 4'a of a clutch member 4' and to form its crowning in the extending direction of the one set of cam surfaces 11'a, 11'b as shown in FIG. 7. In addition it is also possible to form the crowning (not shown) both in the width direction and the circumferentially extending direction of the one set of cam surfaces 11a, 11b so that bulged portion can be formed substantially at the center both in the width direction and the extending direction of the one set of cam surfaces 11a, 11b.

Although it has described that the crowning is formed on the one set of cam surfaces 11a, 11b in the illustrated embodiment, it should be noted that the crowning may be formed on the other set of cam surfaces 12a, 12b in place of the one set of cam surfaces 11a, 11b. However in such a case it should be understood that the cam surfaces 12a, 12b on which the crowning is formed correspond to "one set of cam surfaces" and cam surfaces 11a, 11b on which the crowning is not formed correspond to "other set of cam surfaces" in this specification.

A second embodiment is described below.

Similarly to the first embodiment described above, the power transmitting apparatus can be also mounted on a vehicle such as a motorcycle to arbitrarily transmit or cut-off the driving force of an engine to or from a transmission or driving wheel. The power transmitting apparatus can comprise a clutch member 4" on which one set of cam surfaces 13 (cam surfaces 13a, 13b) and a pressure member 5' on which the other set of cam surfaces 14 (cam surfaces 14a, 14b). The clutch member 4" can include a circumferential edge 4"a and boss 4"b. Since other structural elements such as a clutch housing 2. driving clutch plates 6, driven clutch plates 7 etc. can be the same as those in the first embodiment, illustration and description of them is omitted.

In this second embodiment, the one set of cam surfaces 13a, 13b and a region near them are formed as separate members different from the clutch member 4" or the pressure member 5' and the separate members are secured on the circumferential edge of the clutch member 4" or on a back surface of the pressure member 5' by insert. Similarly to the first embodiment, the crowning can be formed on the cam surfaces 13a, 13b of the separate member secured on the clutch member 4" in their width direction or their extending direction. The crowning may be formed on the cam surfaces 14a, 14b of the separate member secured on the pressure member 5' in their width direction or their extending direction.

According to the second embodiment, since the one set of cam surfaces 13a, 13b and their near region as well as the other set of cam surfaces 14a, 14b are formed by separate members respectively from the clutch member 4" and pressure member 5', the crowning can be easily formed even in a place in which formation of crowning by casting is difficult (e.g. place in which the one cam surface 13b or the other cam surface 14b has a reverse gradient in casting). It is of course that provision of the crowning in the second embodiment can exhibit same effects as those in the first embodiment (i.e. intended cam characteristics can be obtained even in case of a cam surface having a large width).

The separate member can be secured to the clutch member 4" or the pressure member 5' by using any other securing means such as bolts than insert. In addition the separate member may be made of material different from materials used in the clutch member 4" or the pressure member 5' (e.g. when the clutch member 4" or the pressure member 5' can be made of aluminum, the separate member may be made of steel etc.). In addition, it is also possible to form as a separate member only a portion on which the crowning can be formed and to form the other portion having no crowning integrally with the clutch member or the pressure member.

The power transmitting apparatuses disclosed herein can be applied to those having different outline configurations or additional functions if they are those in which one set of cam surfaces for the pressure-contact assisting cam or the back-torque limiting cam are formed along the circumferential edge of the clutch member and the crowning is formed in the extending direction of cam surfaces or the width direction.

Although the present inventions have been described with reference to the preferred embodiments, the present inventions are not limited to the illustrated explanations. For example, the cam surface on which the crowning is formed can be formed on the other portion along the circumferential edge of the clutch member (e.g. a stopper portion in the clutch member for limiting the rotation of the pressure member). In addition the present inventions can be applied to a power transmitting apparatus in which either one of the pressure-contact assisting cam or the back-torque limiting cam between the clutch member and the pressure member. The power transmitting apparatuses can be applied to a power transmitting apparatus of various multiple disc types used for automobiles, three and four wheeled buggies or various generalized machines.

What is claimed is:

1. A power transmitting apparatus comprising:
   a clutch housing rotatable together with an input member;
   a plurality of driving clutch plates mounted on the clutch housing and rotatable together with the clutch housing;
   a plurality of driven clutch plates alternately arranged between the driving clutch plates and movable between pressure-contact and release positions relative to the driving clutch plates;
   a clutch member of a substantially cylindrical configuration connected to an output member for rotation about a rotational axis, the driven clutch plates being mounted on the clutch member;
   a pressure member configured to be moveable so as to press and release the driving clutch plates relative to the driven clutch plates;
   a pressure-contact assisting cam configured to increase a pressure-contacting force between the driving clutch plates and driven clutch plates when a condition in which a rotational force input to the input member is transmitted to the output member; and
   a back-torque limiting cam configured to release the connection between the driving clutch plates and the driven clutch plates when the rotation speed of the output member has exceeded that of the input member;
   wherein at least one cam surface included in at least one of the pressure-contact assisting cam and the back-torque limiting cam is arranged so as to extend along a circumferential edge of the clutch member; and
   wherein said at least one cam surface is crowned along at least one of an extending direction and a width direction, the extending direction being defined as a direction parallel to the rotational axis, the width direction being defined as a direction which extends from a radially inner portion of the clutch member to a radially outer portion of the clutch member, relative to the rotational axis.

2. A power transmitting apparatus of claim 1 wherein said at least one cam surface is disposed on the clutch member is formed by cutting out the circumferential edge of the clutch member, and wherein at least another cam surface is disposed on the pressure member and is arranged oppositely to said at least one cam surface on the clutch member and is formed integrally with the pressure member and projects therefrom.

3. A power transmitting apparatus of claim 1 wherein said at least one surface is disposed on the clutch member formed as a separate member different from the clutch member or the pressure member, and wherein the separate member is secured to the clutch member or the pressure member.

4. A power transmitting apparatus comprising:
   a pressure-contact assisting cam configured to increase a pressure-contacting force between driving clutch plates and driven clutch plates; and
   a back-torque limiting cam configured to release the connection between the driving clutch plates and the driven clutch plates;
   wherein at least one set of cam surfaces of at least one of the pressure-contact assisting cam and the back-torque limiting cam comprises a first set of cam surfaces on a clutch member arranged so that they extend along a circumferential edge of the clutch member mounted for rotation about a rotational axis;
   wherein said first set of cam surfaces are crowned along at least one of an extending direction and a width direction, the extending direction being defined as a direction parallel to the rotational axis, the width direction being defined as a direction which extends from a radially inner portion of the clutch member to a radially outer portion of the clutch member relative to the rotational axis; and
   wherein at least a second set of cam surfaces are arranged oppositely to said first set of cam surfaces on the clutch member, the second set of cam surfaces being integral with a pressure member.

5. A power transmitting apparatus of claim 4 wherein said first set of cam surfaces on the clutch member are formed by cutting out a circumferential edge of the clutch member.

6. A power transmitting apparatus of claim 4 wherein at least one of the first and second sets of cam surfaces are formed as part of separate members different from the clutch member or the pressure member, and wherein the separate members are secured to the clutch member or the pressure member.

7. A power transmitting apparatus comprising:
   a clutch housing rotatable together with an input member;
   a plurality of driving clutch plates mounted on the clutch housing and rotatable together with the clutch housing;
   a plurality of driven clutch plates alternately arranged between the driving clutch plates and movable between pressure-contact and release positions relative to the driving clutch plates;
   a clutch member of a substantially cylindrical configuration including an annular wall and being connected to an output member so as to rotate about a rotational axis, the rotational axis defining an axial direction of the clutch member, a radial direction extending perpendicular to the rotational axis, the driven clutch plates being mounted on the clutch member;
   a pressure member configured to be moveable so as to press and release the driving clutch plates relative to the driven clutch plates;
   a pressure-contact assisting cam configured to increase a pressure-contacting force between the driving clutch plates and driven clutch plates during a condition in which a rotational force input to the input member is transmitted to the output member; and
   a back-torque limiting cam configured to release the connection between the driving clutch plates and the driven clutch plates when the rotation speed of the output member has exceeded that of the input member;

wherein the clutch member comprises cam surfaces defining part of at least one of the pressure-contact assisting cam and the back-torque limiting cam, the cam surfaces positioned circumferentially around an edge of the annular wall of the cylindrical clutch member, each of the cam surfaces being crowned in at least one of the radial direction and the axial direction.

8. A power transmitting apparatus of claim 7, wherein the cam surfaces are formed by cutting out portions of a circumferential edge of one end of the clutch member.

9. A power transmitting apparatus of claim 7, wherein the crowned cam surfaces comprise bulged portions located substantially in the center of each cam surface.

10. A power transmitting apparatus of claim 7, wherein the pressure member comprises cam surfaces with substantially no crowning.

11. A power transmitting apparatus of claim 7, wherein the pressure member comprises cam surfaces formed integrally as part of the pressure member and projecting therefrom.

12. A power transmitting apparatus of claim 7, wherein the cam surfaces are formed as part of separate members which are secured to the clutch member or the pressure member.

13. A power transmitting apparatus of claim 7, wherein the arcuate wall forms an open, cylindrical body of the clutch member.

14. A power transmitting apparatus of claim 7, wherein the arcuate wall has a uniform thickness.

15. A power transmitting apparatus of claim 7, wherein the pressure-contact assisting cam comprises one crowned cam surface on the cam member and one non-crowned cam surface on the pressure member.

16. A power transmitting apparatus of claim 7, wherein the back-torque limiting cam comprises one crowned cam surface on the cam member and one non-crowned cam surface on the pressure member.

17. A power transmitting apparatus comprising:
 a clutch member of a substantially cylindrical configuration including an annular wall and being connected to an output member so as to rotate about a rotational axis, the rotational axis defining an axial direction of the clutch member, a radial direction extending perpendicular to the rotational axis, the clutch member including a first set of cam surfaces;
 a pressure member mounted for rotation about the rotational axis, the pressure member including a second set of cam surfaces positioned to contact the first set of cam surfaces of the clutch member;
 at least a plurality of driving clutch plates and a plurality of driven clutch plates disposed between the clutch member and the pressure member so as to be displaceable along the rotational axis relative to each other;
 at least one of the first and second set of cam surfaces being crowned in at least one of the radial direction and the axial directions.

18. A power transmitting apparatus of claim 17, wherein the first set of cam surfaces are crowned both the radial direction and the axial directions.

19. A power transmitting apparatus of claim 17, wherein the second set of cam surfaces are crowned both the radial direction and the axial directions.

* * * * *